April 28, 1970　　G. C. TURNER　　3,508,896
METHOD OF PRODUCING AN ARRAY OF LIGHT PIPES
Filed April 27, 1967　　2 Sheets-Sheet 1
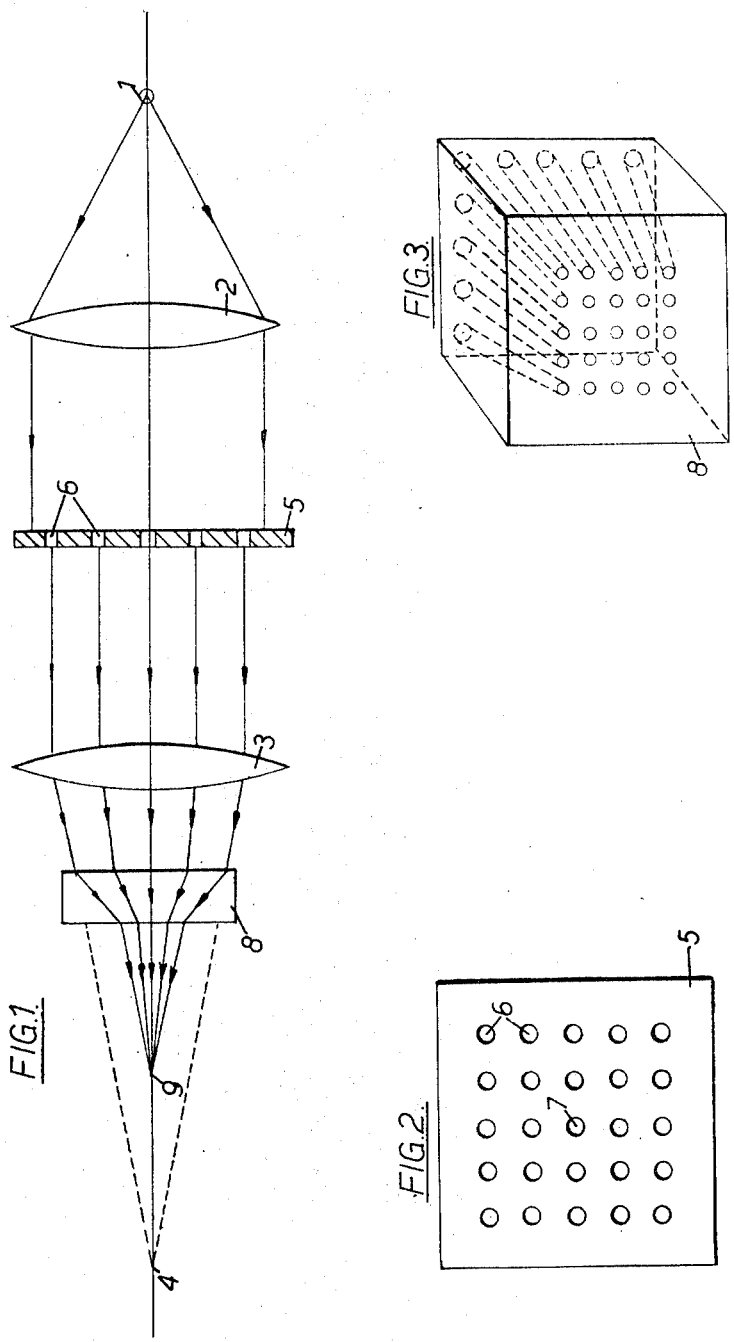
Inventor
G. C. TURNER
By Cameron, Kerkam & Sutton
Attorneys

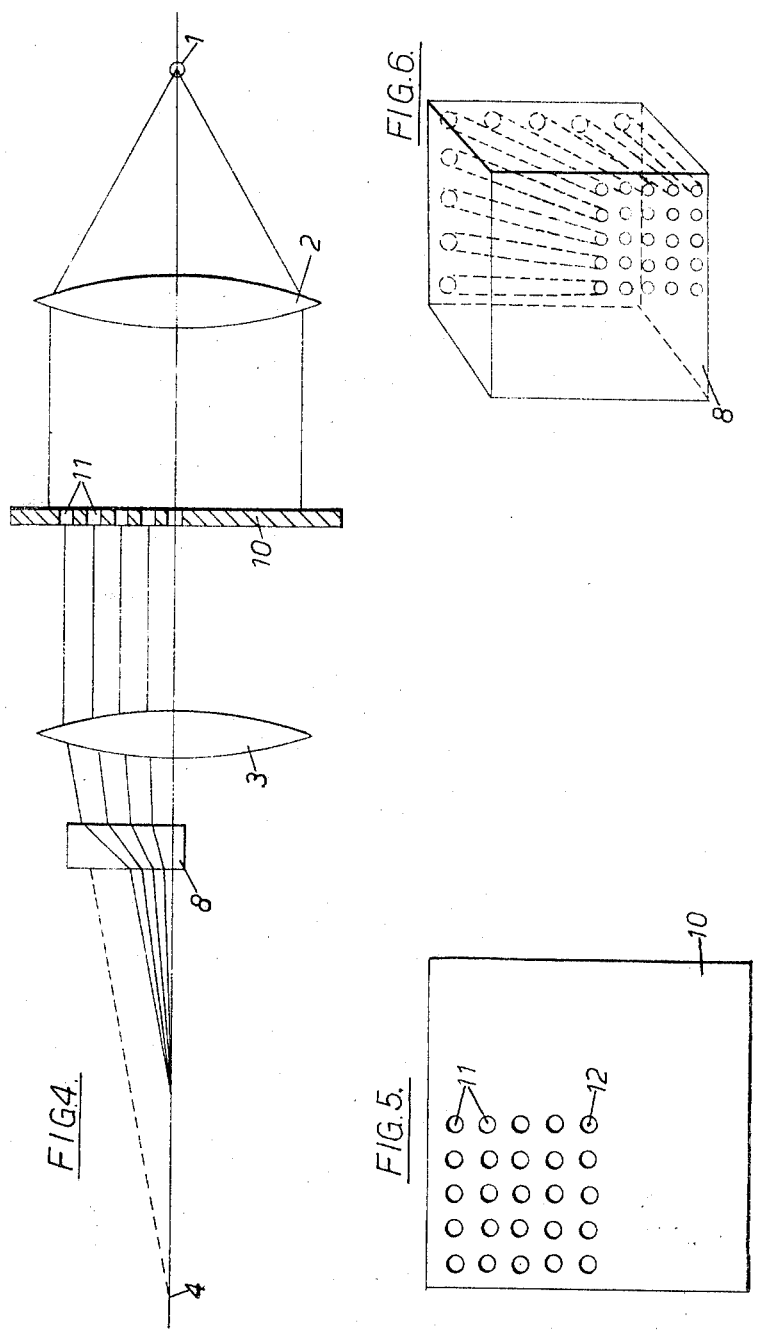

United States Patent Office 3,508,896
Patented Apr. 28, 1970

3,508,896
METHOD OF PRODUCING AN ARRAY OF LIGHT PIPES
George Christie Turner, Stockport, England, assignor to Ferranti, Limited, Hollinwood, England, a company of Great Britain and Northern Ireland
Filed Apr. 27, 1967, Ser. No. 634,232
Claims priority, application Great Britain, May 3, 1966, 19,424/66
Int. Cl. C03c 3/22, 15/00; G02b 5/14
U.S. Cl. 65—31     4 Claims

ABSTRACT OF THE DISCLOSURE

A method of producing an array of light pipes which are of smaller diameter at one end than at the other comprises exposing a block of photosensitive glass to light beams of the required shape and dimensions and etching away the exposed glass, the remainder of the block is then rendered opaque.

---

This invention relates to a method of producing an array of light pipes.

Light pipes for guiding light are well known and are usually of constant internal diameter. In some applications however it is desirable to have an array of light pipes in which each pipe is of smaller diameter at one end than the other end. For example, if it is desired to produce an array of thirty by thirty light sources, gallium phosphide lamps may be used as the light sources, but such lamps at present available have a diameter of approximately thirty thousandths of an inch and an array of such lamps of the size mentioned would require a square having a side greater than one inch. For some applications this is too large and the apparent size of the light sources must be reduced. This reduction may be achieved by means of a simple lens system. This, however, requires space, mechanical tolerances are difficult to maintain, and the lens is inefficient at light gathering. An alternative method of reduction is to use fibre optics. Such a method, however, is expensive and to achieve an appreciable reduction the fibres must have a length of at least one inch; fibres of such length which do not introduce considerable distortion are difficult to obtain.

A simple and cheaper method is to use an array of reducing light pipes in which the diameter at one end of each pipe is smaller than the diameter at the other end and it is an object of the present invention to provide a method of producing such an array.

According to the present invention a method of producing an array of light pipes in which the diameter at one end of each pipe is smaller than the diameter at the other end of the pipe comprises the steps of producing a plurality of non-parallel beams of light equal in number to the required number of light pipes, passing said beams of light through a block of photosensitive glass sensitive to the wavelength of said light, the thickness and position of the block of glass being such that said beams of light have the required diameters when entering and leaving the block of glass, treating the block of glass to develop the portions exposed to said beams of light, etching said block of glass to remove said developed portions, and treating the remainder of said block to render light reflective the walls of the pipes thus provided.

Said non-parallel beams of light may be convergent.

The present invention will now be described by way of example with reference to the accompanying drawings in which:

FIGURE 1 is a schematic drawing showing the optical apparatus for producing one array of light pipes in accordance with the invention, FIGURE 2 is a front view of a mask shown in FIGURE 1, FIGURE 3 is a perspective view of the array produced using the apparatus shown in FIGURE 1, FIGURE 4 is a schematic drawing showing the optical apparatus for producing a different array of light pipes in accordance with the invention, FIGURE 5 is a front view of a mask shown in FIGURE 4, and FIGURE 6 is a perspective view of the array produced using the apparatus shown in FIGURE 4.

Referring now to FIGURES 1 and 2 of the drawings, the apparatus shown includes a source 1 of ultraviolet light, a lens 2 for converting the light from the source 1 into a parallel beam of ultraviolet light, and a further lens 3 having a focal point 4. Interposed between the lenses 2 and 3 is a mask 5 opaque to ultraviolet light and which contains an array of five by five apertures 6 such that the light emerging from the mask 5 is in twenty-five parallel beams. The mask 5 is arranged with its centre 7 on the optical axis of the lenses 2 and 3.

A block 8 of phososensitive glass is placed in the convergent beams of light between the lens 3 and the focal point 4 with its centre on the optical axis. Since the glass has a refractive index greater than one the beams of light are focused to a point 9. For clarity, only the central ray of light passing through each of the apertures 6 in FIGURE 2 has been shown. The diameters of the apertures 6 in the mask 5, the focal length of the lens 3, the thickness of the block 8 and the position thereof with respect to the lens 3 are chosen such that the convergent beams of light have the required diameters of the light pipes when entering and leaving the block 8. If the apertures 6 in the mask 5 have equal diameters the beams of light entering the block 8 will have different diameters as will the beams of light leaving the block 8. If it is desired that the beams of light have equal diameters when entering or leaving the block 8 the apertures 6 in the mask 5 are made to the appropriate size and shape to give the required beam diameter on entering or leaving the block 8.

The photosensitive glass of the block 8 contains a silver halide and is sensitive to ultraviolet light. After the block 8 has been exposed to the ultraviolet light for a suitable time depending upon the intensity of the light source and the thickness of the block 8, the block 8 is treated by baking it at a temperature of approximately 530° C. to develop the portions exposed to the beams of ultraviolet light. The developing treatment causes the exposed portions of the glass to turn black and when the developing process is completed the block 8 is placed in an etching bath of hydrofluoric acid. The hydrofluoric acid ethches away the blackened portions of the glass block 8 and when the etching process is completed the block 8 contains twenty-five pipes, the diameter at one end of each pipe being smaller than the diameter at the other end of the pipe. The block 8 is then treated by baking it at a temperature of approximately 630° C. which turns the glass into a white ceramic and thereby renders light reflective the walls of the pipes contained within the block 8. A perspective view of the array of light pipes produced in this manner is shown in FIGURE 3. The twenty-five smaller ends of the light pipes are shown but for the sake of clarity only nine of the larger ends are indicated.

From FIGURE 3 it will be seen that the reduced ends of the array of light pipes are symmetrically disposed on the face of the block 8. In some applications, however, it is desirable that the reduced ends of the array should be positioned near to one edge of the block 8. For example, if the light passing through the light pipes is used to mark the edge of a photographic film to give information concerning a photograph being taken it is desirable that the array should obscure as little of the film as is necessary and the array should therefore be as near to one edge as possible.

FIGURES 4 and 5 show the optical apparatus which results in the reduced ends of the array of light pipes occurring near one edge of the block 8. The apparatus shown again includes the source 1 of ultraviolet light and the lenses 2 and 3. In this apparatus, however, a mask 10 is used having twenty-five apertures 11 arranged in an array of five by five with the bottom right hand corner aperture centred on the centre 12 of the mask 10 which is again arranged with its centre on the optical axis of the lenses 2 and 3.

With this apparatus the block 8 of photosensitive glass is arranged with its centre offset from the optical axis such that the optical axis passes through the block 8 at a point near the bottom right hand edge as viewed facing the lens 3 in FIGURE 4. Consequently the beams of light entering the block 8 are symmetrically disposed with respect to the face of the block 8 but the beams of light leaving the block 8 are not symmetrically disposed with respect to the face of the block 8.

After exposure to the ultraviolet light the block 8 is developed, etched and baked to convert it to a white ceramic as described above. The resultant array of light pipes is shown in perspective view in FIGURE 6 which again shows the twenty-five smaller ends of the light pipes but indicates only nine of the larger ends. From FIGURE 6 it will be seen that the array of reduced ends is positioned near to one edge of the block 8.

Although in the examples described above the arrays have been shown as having five by five pipes the methods described are suitable for producing arrays of any required size. Also, the methods described above may be modified in many ways. For example, the block may be positioned differently to give different locations of the larger or smaller ends of the light pipes. Furthermore, although the lens 3 has been shown as a convex lens, a concave lens could be used instead, in which case the beams of light would emerge from the block 8 with a larger diameter than that with which they enter the block. The apertures in the mask 5 would also have to be reduced in size and have their position altered accordingly. Also, the block 8 may be treated in a different manner to render light reflective the walls of the pipes. The walls of the pipes could, for example, be silvered.

The array of light pipes produced by the methods described above provide a simple and robust method of reducing the apparent size of an array of light sources and, if it is desired, the light pipes may be filled with a transparent material to exclude dust.

What I claim is:

1. A method of producing an array of light pipes in which the diameter at one end of each pipe is smaller than the diameter at the other end of the pipe, comprising the steps of producing a plurality of non-parallel beams of light equal in number to the required number of light pipes, passing said non-paralllel beams of light through a block of photosensitive glass sensitive to the wavelength of said light, so selecting the thickness of the block of glass and so positioning said block relative to said beams of light that said beams have the required diameters when entering and leaving the block of glass, treating the block of glass to develop the portions thereof exposed to said beams of light, etching said block of glass to remove said developed portions and thus provide an array of non-parallel light pipes extending through said block, the diameter at one end of each pipe being smaller than the diameter at the other end thereof, and treating the remainder of the block to render light reflective the walls of said pipes.

2. A method as claimed in claim 1 in which said non-parallel beams of light are convergent.

3. A method as claimed in claim 2 in which the convergent beams of light are produced by passing a parallel beam of light through a mask having the required number of apertures formed therein and passing the resulting plurality of parallel beams of light through a converging lens located between the mask and the block of glass.

4. A method as claimed in claim 3 in which the block of glass is positioned with its centre offset from the optical axis of said lens.

References Cited

UNITED STATES PATENTS

| 2,628,160 | 2/1953 | Stookey | 156—24 |
| 2,749,794 | 6/1956 | O'Leary | 65—31 XR |
| 2,806,958 | 9/1957 | Zunick | 65—31 XR |
| 3,237,039 | 2/1966 | Fyler. | |
| 3,275,428 | 9/1966 | Siegmund | 65—31 XR |

FOREIGN PATENTS

| 285,738 | 2/1928 | Great Britain. |
| 699,898 | 11/1953 | Great Britain. |
| 248,668 | 4/1926 | Italy. |

FRANK W. MIGA, Primary Examiner

U.S. Cl. X.R.

65—30, 33, 112; 156—24; 161—1; 350—96, 319